(12) United States Patent
Wickizer (10) Patent No.: US 10,885,096 B2
(45) Date of Patent: Jan. 5, 2021

(54) MULTI-USER INTEGRATED COMMUNICATION PLATFORM

(71) Applicant: ACKNOWLOGY, LLC., Kaysville, UT (US)

(72) Inventor: Jon Matthew Wickizer, Kaysville, UT (US)

( * ) Notice: Subject to any disclaimer, the term of this patent is extended or adjusted under 35 U.S.C. 154(b) by 138 days.

(21) Appl. No.: 16/361,886

(22) Filed: Mar. 22, 2019

(65) Prior Publication Data
US 2019/0294626 A1 Sep. 26, 2019

Related U.S. Application Data

(60) Provisional application No. 62/647,513, filed on Mar. 23, 2018.

(51) Int. Cl.
*G06F 16/487* (2019.01)
*G06F 16/438* (2019.01)
*G06F 16/45* (2019.01)

(52) U.S. Cl.
CPC .......... *G06F 16/487* (2019.01); *G06F 16/438* (2019.01); *G06F 16/45* (2019.01)

(58) Field of Classification Search
CPC ........... G06F 16/9535; G06F 16/24578; G06F 3/0482; G06F 3/0488; G06F 9/543; G06F 3/048
USPC ....................................................... 707/722
See application file for complete search history.

(56) References Cited

U.S. PATENT DOCUMENTS

| | | | |
|---|---|---|---|
| 2006/0282660 A1* | 12/2006 | Varghese | G07F 7/1041 713/155 |
| 2012/0316962 A1* | 12/2012 | Rathod | G06Q 10/107 705/14.54 |
| 2013/0298038 A1* | 11/2013 | Spivack | G06F 3/0484 715/753 |

OTHER PUBLICATIONS https://appadvice.com/app/brahma-safety-app/1172564901, accessed on Jun. 10, 2019, pp. 1-5.

* cited by examiner

*Primary Examiner* — Hung T Vy
(74) *Attorney, Agent, or Firm* — Workman Nydegger (57) ABSTRACT

A computer system for automating dynamic multi-user communication is configured to receive a first user dataset associated with a first user. The computer system can communicate first user interface elements to a first user. The computer system then receives, from the first user, a user data response based upon the first user interface elements. Upon receiving the user data response, the computer system identifies, using a correlating function, a second user from. The computer system communicates at least a portion of the user data response to the second user. The computer system then receives, from the second user, a first user data response ranking. The computer system updates a first user ranking with the first user data response ranking. The computer system then communicates the first user data response ranking to the first user.

20 Claims, 5 Drawing Sheets

MULTI-USER INTEGRATED COMMUNICATION PLATFORM

CROSS-REFERENCE TO RELATED APPLICATIONS

This application claims the benefit of and priority to U.S. Provisional Patent Application Ser. No. 62/647,513 filed on Mar. 23, 2018, and entitled "MULTI-USER INTEGRATED COMMUNICATION PLATFORM," which application is incorporated herein by reference in its entirety.

BACKGROUND

Computers, and in particular mobile computers, have had a major impact on nearly every aspect of work and life. The near universal ubiquity of mobile smart phones has greatly increased the ability of individuals to interface with each other through a dynamic, digital interface. Sensors embedded within a mobile device also provide new solutions to existing technical problems. For example, accessing data through a small mobile interface can be cumbersome and inefficient. With the fusion of sensor readings, a mobile device can intelligently present information to a user without requiring the user to navigate a file system hierarchy.

Health and safety programs are an example of an area that has seen a growing adoption of mobile computer platforms. While these software applications are able to provide users with mobile access to important documents and reports, they are typically not dynamic or aware of the user's objectives, safety considerations, or environment. These deficiencies can increase the time required by the user to identify information of use within the file system. Additionally, these deficiencies can also fail to provide an end user with potentially important safety information. As such, there is a need for technical solutions to improve cumbersome file system data access within health and safety program application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include a computer system for automating dynamic multi-user communication that is configured to receive a first user dataset associated with a first user. The computer system can then communicate first user interface elements to each user associated with a first user group variable. The computer system receives, from the first user, a user data response based upon the first user interface elements. Upon receiving the user data response, the computer system identifies, using a correlating function, a second user from within a set of users. The computer system communicates at least a portion of the user data response to the second user. The computer system then receives, from the second user, a first user data response ranking. The computer system updates a first user ranking with the first user data response ranking. The computer system then communicates the first user data response ranking to the first user.

Additional or alternative embodiments also include methods, systems, and computer readable media that are configured to operate a computer system for automating dynamic multi-user communication. The computer system is configured to retrieve from a communication database a first user dataset associated with a first user. The first user dataset comprises a first memory space comprising an acknowledgement variable that describes one or more attributes of a valid class of acknowledging users, a second memory space comprising a first user ranking, and a third memory space comprising a first user group variable.

The computer system is also configured to retrieve, from a user interface database, a first user interface dataset associated with the first user group variable. The first user interface dataset comprises one or more first user interface elements for rendering on end user devices. The computer system can then communicate the first user interface elements to each user associated with the first user group variable. The first user interface elements comprise visual elements that are specific to the first user group variable. The computer system also receives, from the first user, a user data response based upon the first user interface elements.

Upon receiving the user data response, the computer system accesses the first memory space and maps the acknowledgement variable to a set of users that meets the one or more attributes of the valid class. The computer system then identifies, using a correlating function, a second user from within the set of users. The second user may comprise a highest correlation with the first user. The computer system communicates at least a portion of the user data response to the second user. The at least the portion of the user data response comprises one or more second user interface elements for rendering on an end user device associated with the second user.

After communicating the at least the portion of the user data response to the second user, the computer system receives, from the second user, a first user data response ranking of the user data response. The computer system then updates the second memory space to include the first user data response ranking within the first user ranking. The computer system then communicates the first user data response ranking to the first user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or, may be learned by the practice of the invention as set forth hereinafter.

BRIEF DESCRIPTION OF THE DRAWINGS

In order to describe the manner in which the above-recited and other advantages and features can be realized, a more particular description of the subject matter briefly described above will be rendered by reference to specific embodiments which are illustrated in the appended drawings. Understanding that these drawings depict only typical embodiments and are not therefore to be considered limiting in scope, embodi

DETAILED DESCRIPTION

One with skill in the art will appreciate that in the construction, manufacturing, and general industries, employee and individual safety and health is of utmost importance. Nevertheless, if safety is not focused on and tracked, employees will often become lax and engage in unsafe behavior. To fight against this tendency, many organizations have implemented various tools to track and encourage employee compliance with safety policies.

One major movement to aid employees in compliance comprises tracking and encouraging compliance through digital media. Such an approach has the benefit of increasing broad systemic tracking of compliance throughout an entire organization and also reducing the cumbersome nature of physical papers that would otherwise be used.

In at least one embodiment disclosed herein, a safety compliance system gathers data from multiple, different users. The safety compliance system then compares the gathered data against other physical and digital data stored locally and/or within a remote server. By comparing the data, the safety compliance system is able to assist workers in identifying all rectifiable hazards not just identified by the individuals themselves, but by the numerous entries and the experiences of other individuals.

In contrast to conventional paper-based safety tracking methods, the safety compliance system provides feedback and suggestions in real-time (as opposed to lagging indicators) and is able to rely upon data that would not otherwise be available. For example, an electrician may arrive at a construction site for a commercial building. The electrician may enter into the safety compliance system that exposed wiring presents a potential safety concern. The safety compliance system then searches a remote database and identifies various potential safety concerns associated with "wiring." The database may indicate that electrified wires present a particular danger. While this information may be apparent to the electrician, the safety compliance system may go further and provide additional information relating to the safety hazard. For instance, the safety compliance system may identify from the remote database that a lightning storm could electrify the otherwise non-connected wires. Based upon this information, the safety compliance system can gather GPS coordinates from the electrician's smart phone and gather data relating to the weather forecast for the position. If a lightning storm is shown as being likely or imminent, the safety compliance system can issue an alert to the electrician to be particularly cautious around exposed wiring.

The safety compliance system can also provide a feedback and collaboration features for encouraging and increasing safe behaviors. To facilitate encouragement a Personal Safety Assistant ("PSA") can be implemented. In at least one embodiment, the PSA may comprise an Artificial intelligence program application that can communicate with other PSA's to give ideas, suggestions, statistics, coaching, environmental, physical, historical, and other information to the individual. This PSA can provide additional assistance in insuring that safety and/or health items not identified by the individual are brought to the attention of the individual from the PSA.

One will appreciate that the PSA can, in real time, interactively collect the safety and health data as identified by the individual, capture and measure the safety and health data as input by other individuals, and make suggestions and additional precautionary measures to the individual based on the historical data collected over time and in work activities and industries.

In at least one embodiment, the PSA collects, measures, prepares, receives and displays this information for the specific individual. The PSA also displays these efforts to others for their personal acknowledgment to the individual who is preparing the current safety effort. This form of communication or recognition motivates the individual to continue the process.

In at least one embodiment, the PSA is a software application that can be executed within web-based portals or locally on devices, such as phones, tablets, watches, wearable technologies, computers, any and all electronic data collection and display devices both through sight, sound, touch, feel and thought. One will appreciate that any combination of components within the safety compliance system can be executed on a local device and/or within the cloud.

In at least one embodiment, the PSA collects, retains and communicates individual work place safety information, crew safety information, site safety information, company safety information, industry safety information, area safety information, individual and group risk assessments, trainings, peer acknowledgments, micro learning, recognitions, data from other safety compliance systems and other safety related information. The PSA can then analyze all of the individual data, current conditional information and historical data and formulate corrective actions, ideas and suggestions of additional hazards and prompt individuals respecting additional precautionary measures to implement. The PSA also tracks improvement in safety efforts, hazard identification, hazard recognition, training, education, other current data input both verbal, type or print, proximity location, outside source material and other historical, real time information.

The PSA may be configured to match this information with other safety compliance systems and data repositories and/or the main central processing center(s) and administrators. The information may be connected with the individual, organization, physical location and other data to make visible the history and progression of the individual, statistical information for the organization, information for the physical location and data to be shared with other safety compliance systems. The PSA may record, for the individual, safety and compliance efforts, education and learning history, work type and employment experiences, and various peer, manager, executive, family, friend and other individual acknowledgments.

Additionally, in at least one embodiment, the PSA enables the acknowledgment to and from, Peer to Peer, manager to manager, executive to executive, field worker to field worker, field worker to manager, field worker to executive, manager to field worker, manager to manager, manager to executive, executive to field worker, executive to manager and/or executive to executive. The PSA also enables acknowledgment to and from all work group individuals to any other entities, family members, relatives, friends, peer groups, organization, favorites lists, contacts list, and random individuals. The PSA communicates with the other PSA systems, matching individuals that the systems, or individuals or administrators, identify as beneficial or able to provide helpful, needed information. The information may be helpful to the PSA or individual who is broadcasting the information or may be information received from other PSA systems to give help or suggestions.

Figure 1:
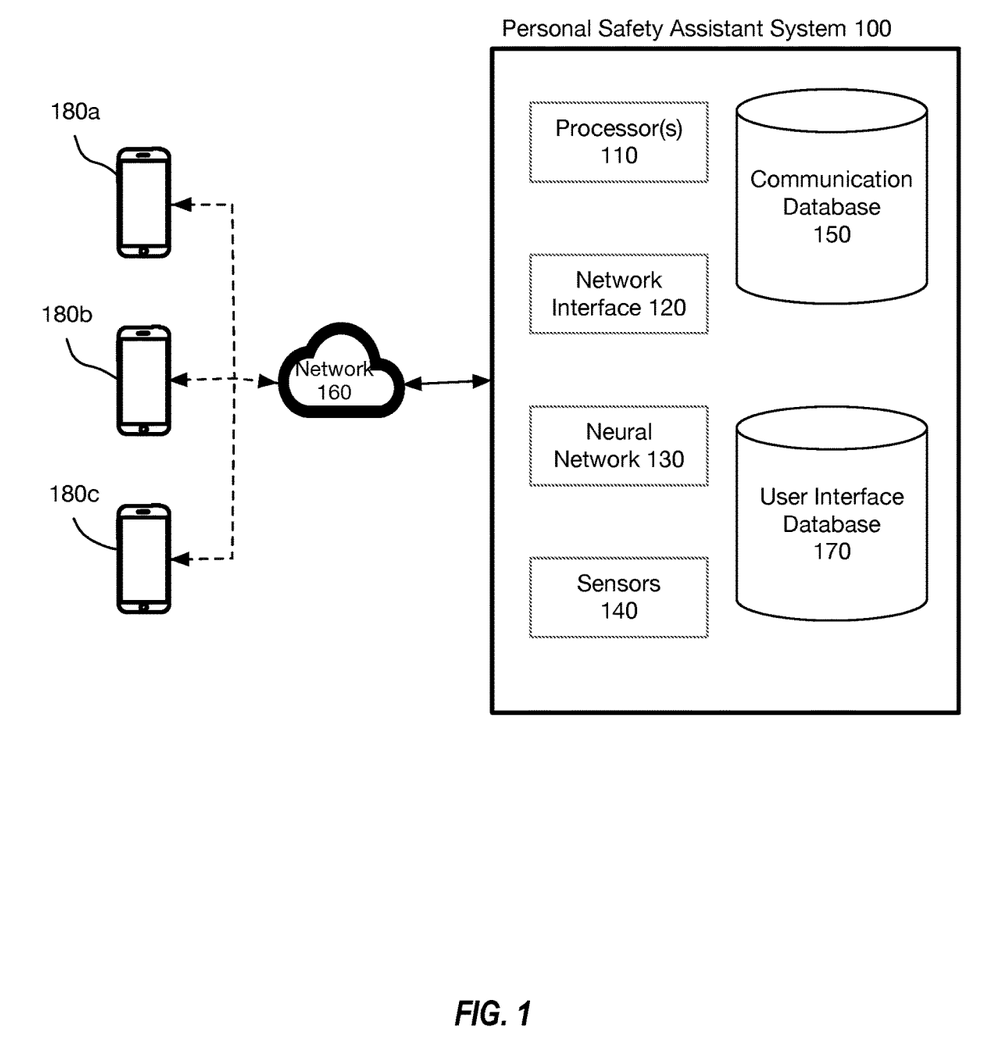
- FIG. 1 illustrates a schematic diagram of an embodiment of a personal safety assistant system.

Turning now to FIG. 1, an embodiment of a PSA system 100 is depicted. The PSA system 100 comprises one or more processors 110, a network interface 120, a neural network 130, sensors 140, a communication database 150, and a user interface database 170. In at least one embodiment, the PSA system 100 is executed on and comprises a server (such as a cloud server), a personal computer, a mobile computing device (such as a mobile phone), or a combination of one or more of these different computer systems. One will appreciate that the various modules and components (e.g., 100, 110, 120, 130, 140, 150, 160, 170, 180(a-c)) are provided only for the sake of example and explanation. In alternative or additional embodiments, the modules and components may be otherwise divided, combined, or described.

In at least one embodiment, a user executes at least a portion of the PSA system 100 on a mobile device (e.g., 180a, 180b, or 180c). The PSA system 100 may be running occasionally or constantly in the background. Another portion of the PSA system 100 may be executed on a server that is connected to the mobile devices 180(a-c) by a network 160. For example, the PSA system 100 may communicate to sensors 140, such as a GPS integrated into a mobile device 180(a-c) to occasionally identify the user's location. The one or more processors 110 can gather the user's location information and compares the user's location to a dataset of locations.

In at least one embodiment, the dataset of locations comprises various worksites that are associated with the user's company. The dataset of locations may be stored locally on each mobile device 180(a-c) or remotely on a server. In at least one embodiment, an administrator generates the dataset of locations and updates it to reflect currently active work sites. Additionally, in at least one embodiment, the PSA system 100 accesses a calendar application (not shown) that is also executing on the user's mobile device. The PSA system 100 identifies, from the user's calendar, work sites that the user will be at over the next several days. The PSA system 100 then accesses through the network interface 120 and across the network 160 the dataset of locations that include the worksite(s) that the user is scheduled to be at.

In at least one embodiment, the dataset of locations comprises geographic coordinates describing the locations, data received from other users regarding the locations, and general company information. For example, the data received from other users may indicate hazards or health concerns that are associated with the worksite(s). Additionally, the data may comprise individual pictures or video of the hazards and/or precise coordinates of where the hazards are located within the worksite(s). A user can then be visually warned of the hazards and/or warned when they get close to the hazards.

In at least one embodiment, storing the user's calendared worksites provides several significant technical benefits. For example, one will appreciate that many work sites are either extremely remote or deep within a building and in both cases suffer from poor network coverage. Under such circumstances, it may not be possible to gather data from a remote server. As such, the PSA system 100 is able to predict based upon the user's calendar what location data should be gathered. The PSA system 100 can then update the location data when it is in contact with a network 160 again. Additionally, if the user's location (as received from the sensors) does not match any worksite location dataset of locations, the one or more processors 110 can communicate through the network interface 120 and the network 160 with a server (shown as 400 in FIG. 4). The server 400 can store a complete set of location data for all active worksites. As such, the PSA system 100 can search all possible work locations to determine if the user went to an unexpected worksite.

Once the user arrives at the identified worksite, the user can also upload hazards that the user identifies. For example, the user may identify an icy surface. Using mobile device 180a, the user can take a picture of the icy surface and/or write a description of the hazard presented by the icy surface. The PSA system 100 can then associate a particular metadata tag with the user's input. The metadata tag may comprise information about the GPS coordinates of the icy surface, the user's identification, the user's occupation, and/or other similar data.

When a second user comes to the site, a second PSA system 100 running on the second user's mobile device 180b can display to the second user a warning of the icy surface. In particular, the warning can be displayed based upon the metadata tag associated within the warning and information associated with the second user. For example, the second user may also have the same occupation as the first user. Based upon the common occupation, the PSA system 100 may determine that the warning should also be displayed to the second user.

In at least one embodiment, the PSA system 100 may also alert other mobile devices 180(a-c) that are at the same site to closely monitor accelerometers within the sensors 140 of the PSA. When a particular accelerometer detects a sudden high energy impact, the PSA system 100 may send an alert to the mobile device 180c associated with the particular accelerometer to check whether the user has slipped on the ice and needs assistance. If no response is received within a threshold period of time, the PSA system 100 may send another alert to other mobile devices 180a, 180b that are also at the site with instructions to check on the user associated with the original accelerometer readings. As such, the PSA system 100 can cross link hazards (such as ice) with sensor readings (such as accelerometers) to both send instructions to users and to monitor health and safety of users.

In at least one embodiment, additional means may be used to communicate identified hazards to the user. For example, a user may enter a work site without a mobile phone 180(a-c). Nevertheless, sensors and devices embedded throughout the worksite and/or upon the individual, physically embedded permanently or temporarily or worn by or placed upon the worker may be configured to communicate with the user. For instance, information may be communicated via wearables, climate change devices in the area, warning lights, warning sounds, etc.

In at least one embodiment, for example, upon entering a room where another user identified a hazard within the PSA system 100, room temperature can change, lighting can change to red hue, and/or a distinct smell that is associated with a pre-identified hazard can be emitted. As such, sensors and emitters at the work site can also pull data from the PSA system 100. In at least one embodiment, the neural network 140 identifies data that should be pushed to onsite safety emitters. Accordingly, various forms of communication can be used to indicate to a worker that a hazard is nearby.

In further embodiments, the user may wear a smart garment that can constrict the user's movements when the user is interacting with hazards, such as live wiring. The constriction may be such that the user is prevented from touching the live wires or such that the user's movements are slowed down to prevent accidental contact. Accordingly, various external sensors and communication devices can be used to communicate with a user in the absence of or in addition to a mobile smart phone.

In at least one embodiment, a PSA system 100 can be executed using the neural network 130 within the PSA system 100. The neural network 130 can provide the user with "intelligent" insight and feedback. For example, the neural network 130 may identify hazards at the worksite which have presented particular trouble to the user in the past. The neural network 130 may then provide the user with a notice of the hazards and training tips to avoid the associated safety problems.

Figure 2:
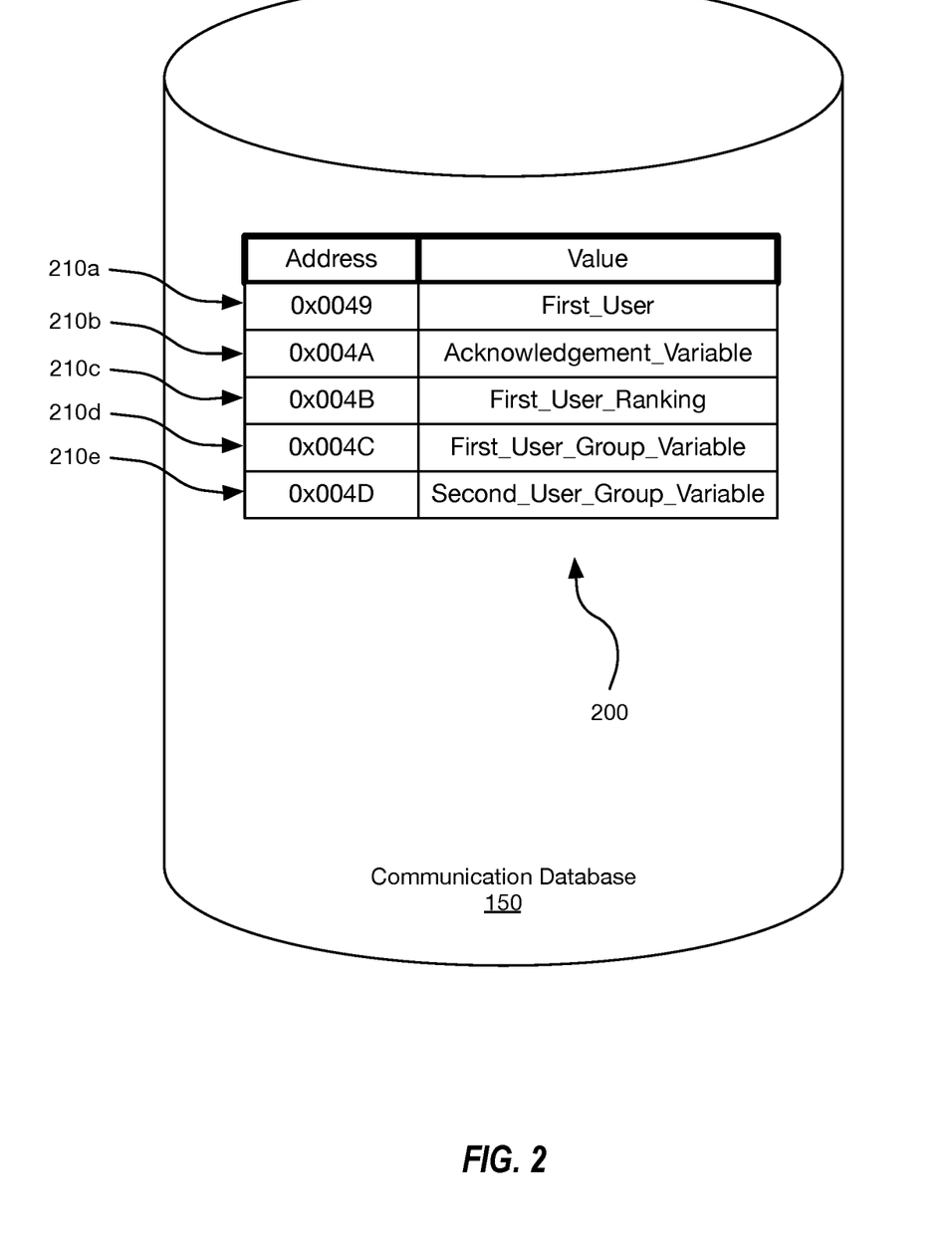
FIG. 2 illustrates a schematic diagram of an embodiment of memory structures for a communication database.

In at least one embodiment, the PSA system 100 can be configured to retrieve from a communication database 150 a first user dataset (shown as 200 in FIG. 2). associated with a first user. FIG. 2 illustrates that an embodiment of the first user dataset 200 may comprise user name memory space 210a associating the first user dataset with an authenticated user account. The first user dataset 200 may also comprise a first memory space 210b comprising an acknowledgement variable that describes one or more attributes of a valid class of acknowledging users.

The first user dataset 200 may additionally comprise a second memory space 210c comprising a first user ranking, which describes one or more relative rankings of the first user. For example, the first user ranking may describe an overall safety ranking of the first user as determined by the PSA system 100. Additionally or alternatively, the first user ranking may comprise a combination of rankings of the first user provided by other users.

The first user dataset 200 may further comprise a third memory space 210d comprising a first user group variable. The first user group variable indicates one or more group associations between the first user and other users within the PSA system 100. For example, the first user group variable may associate the first user with a first group of other users. In at least one embodiment, for example, the first user group variable is associated with plumbers.

Similarly, the first user dataset 200 may comprise additional memory spaces, such as a fourth memory space 210e for describing second user group variables or any other variable of interest. The second user group variable may associate the first user with a second group of users.

The PSA system 100 may also be configured to retrieve, from a user interface database 170, a first user interface dataset (shown as 300 in FIG. 3) associated with the first user group variable. The first user interface dataset comprises memory spaces 310(a-e) that include one or more first user interface elements for rendering on end user devices (e.g., 180a-c). As used herein, end user devices are depicted and described as "mobile devices," but may also include any computing device local to the user. The first user interface elements may comprise questions, trainings, videos, alerts, manuals, or any other items of use for the PSA system 100. In at least one embodiment, the first user interface dataset comprises prompts requesting answers to questions relating to the first user group variable. Similarly, the first user interface dataset may comprise training videos relating to the first user group variable. For example, the first group variable may indicate that the first user is a plumber. As such, the first user interface dataset may comprise questions and training videos relating to plumbing.

Figure 3:
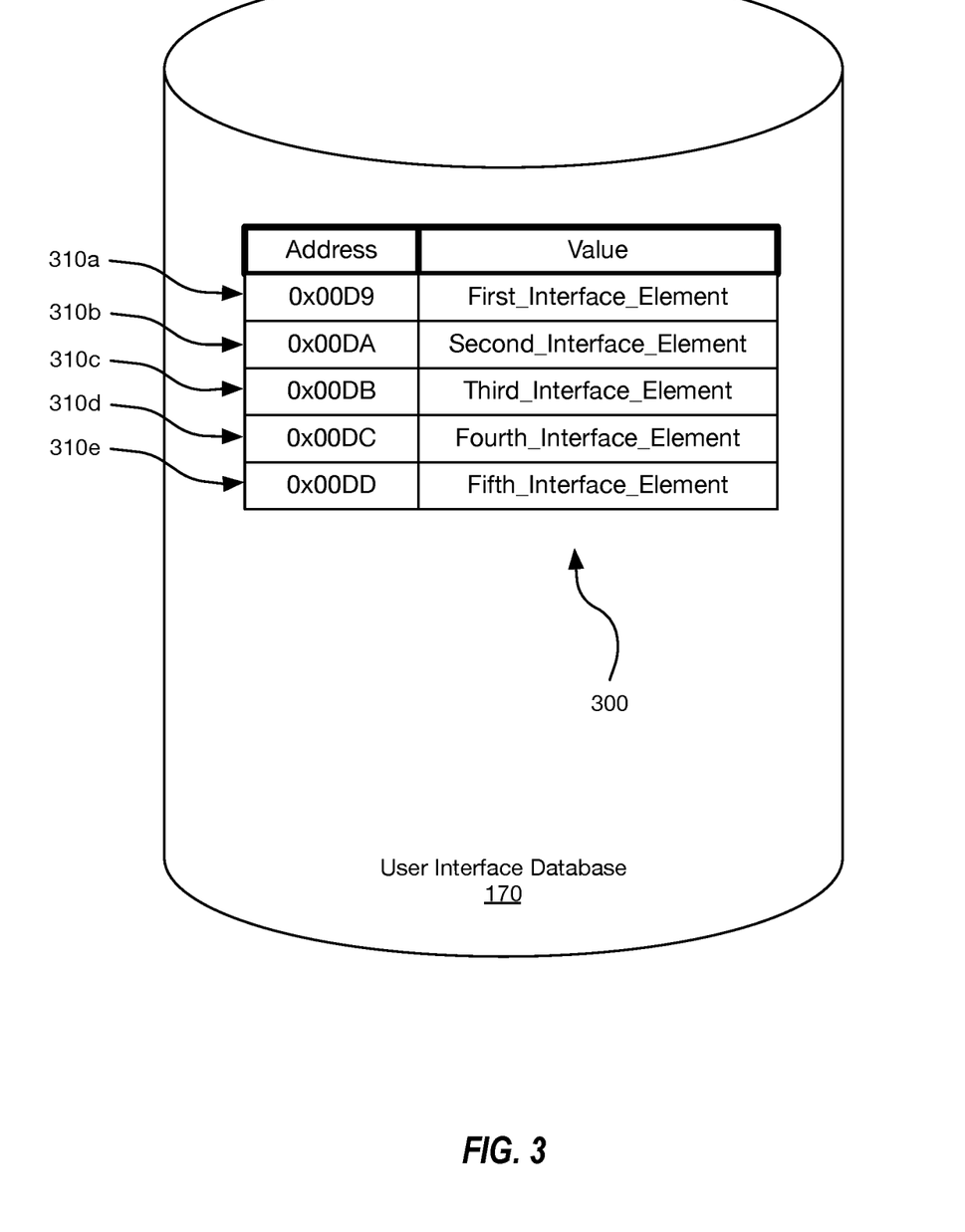
FIG. 3 illustrates a schematic diagram of an embodiment of memory structures for a user interface database.

Additionally, in at least one embodiment, the PSA system 100 maps each user's first user group variable to a subset of the user interface elements stored in the memory spaces 310(a-e). For instance, some user interface elements may be associated with a first user group variable that indicates that associated users are plumbers. In contrast, some user interface elements may be associated with a first user group variable that indicates that associated users work at a particular geographic location. One will appreciate that any number of useful associations of user interface elements to different user group variables may be used.

In the case that the first user group variable is associated with a first geographic area, the PSA system 100 can receive a geolocation from a GPS device integrated within an end user device (also referred to as mobile device 180a) associated with the first user. The PSA system 100 then determines that the geolocation is within a threshold distance of the first geographic area. Using this information, the PSA system 100 retrieves from the communication database 170 the first user interface dataset 300 associated with the first user group variable. The first user interface dataset 300 comprises one or more first user interface elements that are specific to the first geographic area. In at least one embodiment, the first user interface dataset 300 comprises information specific to the first geographic area that is not associated with any other geographic areas. For example, the first user dataset 300 may comprise blueprints and/or maps specific to the first geographic area.

Once the PSA system 100 has identified first user interface elements (e.g., user interface elements associated with memory spaces 310a and 310c), the PSA system 100 communicates the first user interface elements to each user associated with the first user group variable. The first user interface dataset comprises visual elements that are specific to the first user group variable. For example, the identified first user interface elements may comprise a training manual for plumbers, site-specific hazards relating to a particular geographic work site, and questions for plumbers to answer relating to safety in their workplace.

In at least one embodiment, the PSA system 100 then receives, from the first user, a user data response based upon the first user interface dataset. For example, the first user may be a plumber who answers the questions presented by the first user interface elements. The questions may describe hazards in the first user's worksite and also a plan to mitigate those hazards.

Once the PSA system 100 receives the user data response from the first user, the PSA system 100 accesses the first memory space 210b (shown in FIG. 2) and maps the acknowledgement variable from the first user dataset 200 to a set of users that meets the one or more attributes of the valid class described by the acknowledgement variable. For example, in at least one embodiment, the acknowledgement variable may comprise one or more attributes of a valid class that includes plumbers and/or plumbers with a certain level of experience. In at least one embodiment, the acknowledgement variable, which is stored in the first memory space 210b, comprises an indication that the second group of users, as defined by the second user group variable stored in the fourth memory space 210e, is a valid class of acknowledging users.

In another embodiment, the acknowledgement variable may dynamically define the one or more attributes of the valid class. For example, based upon the user data response from the first user, the acknowledgement variable may be dynamically defined in response to the first user's answers. For instance, if the first user indicates a dangerous work hazard of a particular severity, the acknowledgement variable may dynamically define the one or more attributes of the valid class to include a supervisor, a safety expert, and/or a plumber with a threshold level of experience. Additionally, the acknowledgement variable may dynamically define the one or more attributes of the valid class to include a geolocated location within a certain distance from the first user's geolocation. As such, if the first user identifies a high risk plumbing hazard, the acknowledgement variable may be dynamically defined to insure that the PSA system 100 maps the acknowledgement variable to another individual with significant skill to analyze the hazard, and in some cases ensure that the other individual is close enough to the first user's worksite to provide timely assistance, if needed.

Once the set of users are identified based upon the one or more attributes defined by the acknowledgement variable, the PSA system 100 identifies, using a correlating function, a second user from within the set of users. In at least one embodiment, the second user comprises the highest correlation with the first user, as defined by the correlating function. The correlating function may comprise any number of different matching techniques, including a high-to-low match function that matches relatively low-ranking users (as defined by the third memory space 210c user ranking) to relatively high-ranking users selected from the set of users.

Figure 4:
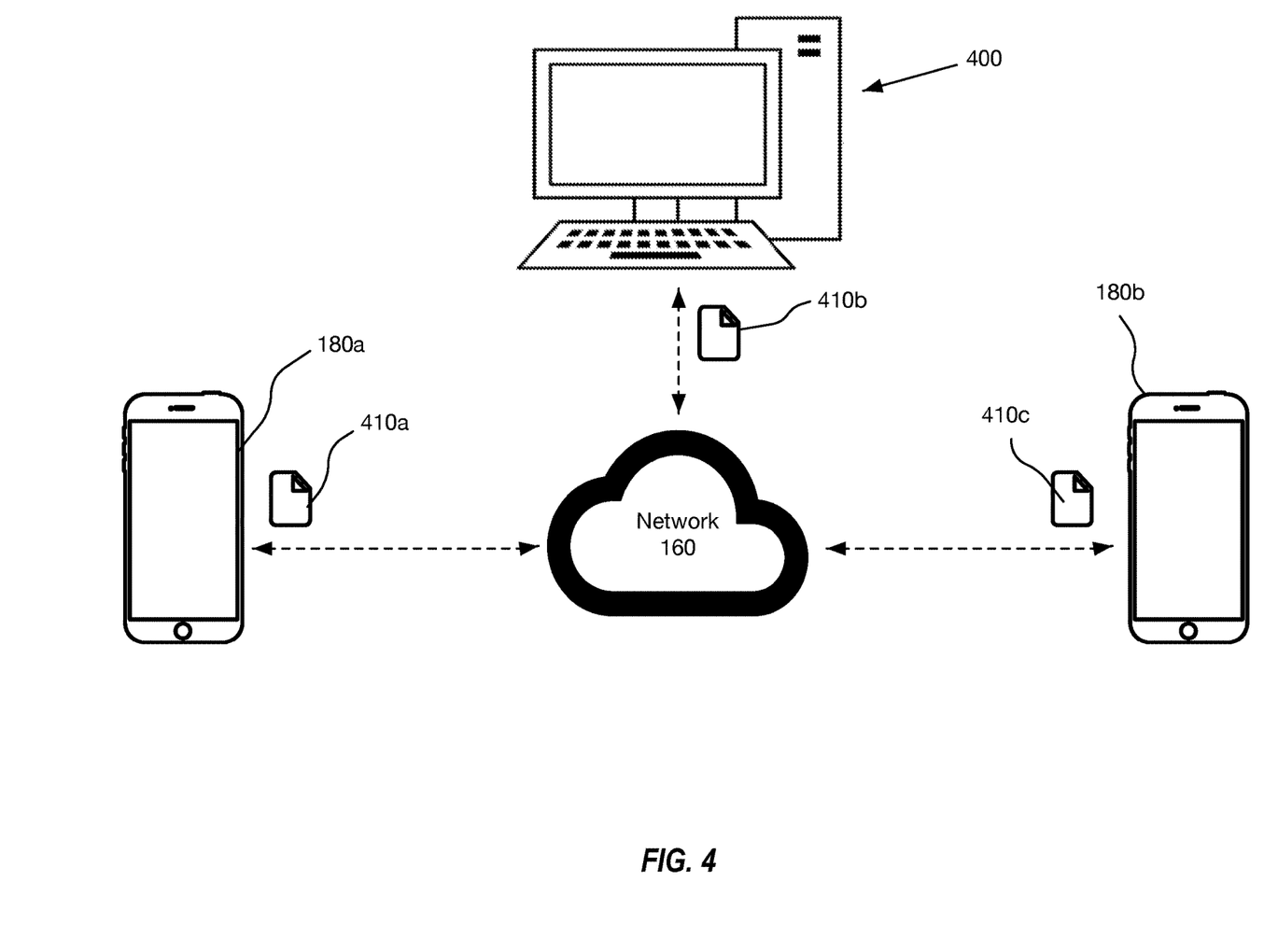
FIG. 4 illustrates a schematic diagram of mobile computing devices in communication with an embodiment of a personal safety assistant system.

Additionally or alternatively, the correlating function may be based upon the content of the user data response. For example, as depicted in FIG. 4, the user data response 410a may comprise an indication of a workplace hazard. The severity of the workplace hazard may be determined by the first user at the time the user data response is entered into the first user's mobile device 180a. The severity of the workplace hazard may also be determined in whole or in part by analysis of at least a portion of the user data response 410b by the neural network 130 on a server 400. The correlating function may match the severity of the workplace hazard to a second user with the most ability and/or experience to mitigate that particular hazard. Such a determination may be based upon historical data gathered by the PSA system 100 that indicates the second user has worked more than a threshold number of years, has received more than a threshold amount of training on the particular workplace hazard, and/or has a personal safety record indicating a strong safety stance.

Once the second user is identified, the PSA system 100 communicates at least a portion of the user data response to the second user's mobile device 180b. The user data response 410a comprises one or more second user interface elements for rendering on an end user device (also referred to as mobile device 180b) associated with the second user. The PSA system 100 then receives, from the second user's mobile device 180b, a first user data response ranking 410c of the user data response. The first user data response ranking 410c may comprise an objective and/or subjective ranking of the first user data response 410a by the second user. The second user may rank on factual correctness, effort placed into the first user data response, or any other desired paradigm.

Upon receiving the first user data response ranking 410c, the PSA system 100 updates the second memory space 210b to include the first user data response ranking with the first user ranking attribute. The PSA system 100 also communicates the first user ranking to the first user.

Accordingly, as described herein a PSA system 100 can dynamically combine sensor data, user data, and user data responses to identify communication pathways between different users. These communication pathways provide important and unique input to the different users of the system. For example, a user who identified a high severity hazard may be quickly placed into contact with a specialist for that particular workplace hazard. As such, disclosed embodiments provide significant technical advances in automating dynamic multi-user communication.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
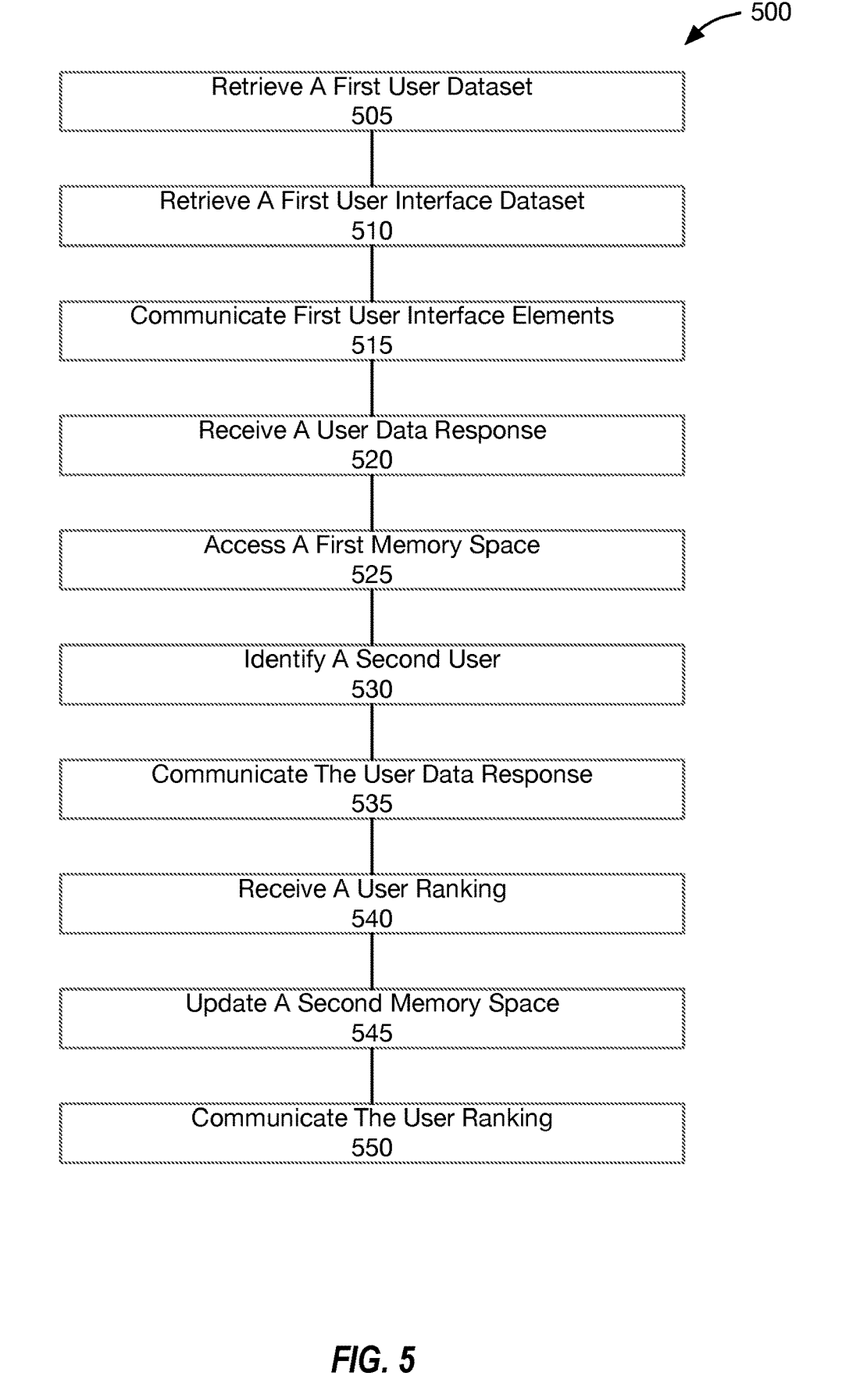
FIG. 5 illustrates a flow chart of an embodiment of a method for automating dynamic multi-user communication.

FIG. 5 illustrates a flow chart of an embodiment of a method 500 for automating dynamic multi-user communication. The method 500 comprises an act 505 of retrieving a first user dataset. Act 505 includes retrieving from a communication database a first user dataset 200 (shown in FIG. 2) associated with a first user. The first user dataset 200 comprises a first memory space 210b comprising an acknowledgement variable that describes one or more attributes of a valid class of acknowledging users. The first user dataset 200 also comprises a second memory space 210c comprising a first user ranking. Further, the first user dataset 200 comprises a third memory space 210d comprising a first user group variable.

The method 500 also comprises an act 510 of retrieving a first user interface dataset. Act 510 includes retrieving, from a user interface database 170 (shown in FIG. 3), a first user interface dataset 300 associated with the first user group variable. The first user interface dataset 300 comprises one or more first user interface elements (shown as associated with memory spaces 310(a-e)) for rendering on end user devices (also referred to as mobile devices 180(a-c)).

In addition, method 500 comprises an act 515 of communicating first user interface elements. Act 515 includes communicating the first user interface dataset 300 to each user associated with the first user group variable. The first user interface dataset 300 comprises visual elements that are specific to the first user group variable.

Method 500 also comprises an act 520 of receiving a user data response. Act 520 includes receiving, from the first user (e.g., the first user associated with mobile device 180a), a user data response 410a (shown in FIG. 4) based upon the first user interface elements.

Additionally, method 500 comprises an act 525 of accessing a first memory space. Act 525 includes accessing the first memory space 210b and map the acknowledgement variable to a set of users that meets the one or more attributes of the valid class.

Method 500 further comprises an act 530 of identifying a second user. Act 530 includes identifying, using a correlating function, a second user (e.g., the second user associated with mobile device 180b in FIG. 4) from within the set of users. The second user may comprise the highest correlation with the first user. For example, the second user may comprise a relatively high user ranking while the first user may comprise a relatively low user ranking.

In addition, method 500 also includes an act 535 of communicating the user data response. Act 535 includes communicating at least a portion of the user data response

410*a* to the second user (e.g., the second user associated with mobile device 180*b* in FIG. 4). The at least a portion of the user data response 410*a* comprises one or more second user interface elements for rendering on an end user device (also referred to as mobile device 180*b*) associated with the second user.

Method 500 additionally comprises an act 540 of receiving a user ranking. Act 540 includes receiving, from the second user (e.g., the second user associated with mobile device 180*b* in FIG. 4), a first user data response ranking 410*c* of the user data response 410*a*.

Further, method 500 comprises an act 545 of updating a second memory space. Act 545 includes updating the second memory space 210*c* (shown in FIG. 2) to include the first user data response ranking 410*c* (shown in FIG. 4) of the user data response 410*a* within the first user ranking (shown as associated with the second memory space 210*c*).

Further still, method 500 comprises an act 550 of communicating the user ranking. Act 550 includes communicating the first user data response ranking to the first user.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interfaces, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as exemplary forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for automating dynamic multi-user communication comprising:
   one or more processors; and
   one or more computer-readable media having stored thereon executable instructions that when executed by the one or more processors configure the computer system to perform at least the following:
      retrieve from a communication database a first user dataset associated with a first user, wherein the first user dataset comprises:
         a first memory space comprising an acknowledgement variable that describes one or more attributes of a valid class of acknowledging users,
         a second memory space comprising a first user ranking, and
         a third memory space comprising a first user group variable;
      retrieve, from a user interface database, a first user interface dataset associated with the first user group variable, wherein the first user interface dataset comprises one or more first user interface elements for rendering on end user devices;
      communicate the first user interface elements to each user associated with the first user group variable, wherein the first user interface elements comprise visual elements that are specific to the first user group variable;
      receive, from the first user, a user data response based upon the first user interface elements;
      access the first memory space and map the acknowledgement variable to a set of users that meets the one or more attributes of the valid class;
      identify, using a correlating function, a second user from within the set of users, the second user comprising a highest correlation with the first user;
      communicate at least a portion of the user data response to the second user, wherein the at least the portion of the user data response comprises one or more second user interface elements for rendering on an end user device associated with the second user;
      receive, from the second user, a first user data response ranking of the user data response;
      update the second memory space to include the first user data response ranking with the first user ranking; and
      communicate the first user data response ranking to the first user.

2. The computer system of claim 1, wherein the executable instructions include instructions that are executable to configure the computer system to:
   associate the first user group variable with a first geographic area;
   receive a geolocation from a GPS device integrated within an end user device associated with the first user;
   determine that the geolocation is within a threshold distance of the first geographic area; and
   retrieve from the communication database the first user interface elements associated with the first user group variable, wherein the first user interface elements are specific to the first geographic area; and
   communicate the first user interface elements to the first user.

3. The computer system of claim 2, wherein the first user interface elements comprise information specific to the first geographic area that is not associated with any other geographic areas.

4. The computer system of claim 1, wherein the first user group variable associates the first user with a first group of other users.

5. The computer system of claim 4, wherein the first user dataset comprises a second user group variable that associates the first user with a second group of users.

6. The computer system of claim 5, wherein the acknowledgement variable comprises an indication that the second group of users is the valid class of acknowledging users.

7. The computer system of claim 1, wherein the correlating function comprises a high-to-low match function.

8. The computer system of claim 1, wherein the first user interface dataset comprises prompts requesting answers to questions relating to the first user group variable.

9. The computer system of claim 1, wherein the first user interface dataset comprises training videos relating to the first user group variable.

10. A computer-implemented method for automating dynamic multi-user communication comprising:
    retrieving from a communication database a first user dataset associated with a first user, wherein the first user dataset comprises:
       a first memory space comprising an acknowledgement variable that describes one or more attributes of a valid class of acknowledging users,
       a second memory space comprising a first user ranking, and
       a third memory space comprising a first user group variable;
    retrieving, from a user interface database, a first user interface dataset associated with the first user group variable, wherein the first user interface dataset comprises one or more first user interface elements for rendering on end user devices;

communicating the first user interface elements to each user associated with the first user group variable, wherein the first user interface elements comprises visual elements that are specific to the first user group variable;

receiving, from the first user, a user data response based upon the first user interface elements;

accessing the first memory space and map the acknowledgement variable to a set of users that meets the one or more attributes of the valid class;

identifying, using a correlating function, a second user from within the set of users, the second user comprising a highest correlation with the first user;

communicating at least a portion of the user data response to the second user, wherein the at least the portion of the user data response comprises one or more second user interface elements for rendering on an end user device associated with the second user;

receiving, from the second user, a first user data response ranking of the user data response;

updating the second memory space to include the first user data response ranking with the first user ranking; and communicating the first user data response ranking to the first user.

11. The computer-implemented method of claim 10, further comprising:

associating the first user group variable with a first geographic area;

receiving a geolocation from a GPS device integrated within an end user device associated with the first user;

determining that the geolocation is within a threshold distance of the first geographic area; and retrieving from the communication database the first user interface elements associated with the first user group variable, wherein the first user interface elements are specific to the first geographic area; and communicate the first user interface elements to the first user.

12. The computer-implemented method of claim 11, wherein the first user interface elements comprise information specific to the first geographic area that is not associated with any other geographic areas.

13. The computer-implemented method of claim 10, wherein the first user group variable associates the first user with a first group of other users.

14. The computer-implemented method of claim 13, wherein the first user dataset comprises a second user group variable that associates the first user with a second group of users.

15. The computer-implemented method of claim 14, wherein the acknowledgement variable comprises an indication that the second group of users is the valid class of acknowledging users.

16. The computer-implemented method of claim 10, wherein the correlating function comprises a high-to-low match function.

17. The computer-implemented method of claim 10, wherein the first user interface dataset comprises prompts requesting answers to questions relating to the first user group variable.

18. The computer-implemented method of claim 10, wherein the first user interface dataset comprises training videos relating to the first user group variable.

19. A computer program product comprising one or more computer storage media having stored thereon computer-executable instructions that, when executed at a processor, cause a computer system to perform a method for automating dynamic multi-user communication, the method comprising:

retrieving from a communication database a first user dataset associated with a first user, wherein the first user dataset comprises:

a first memory space comprising an acknowledgement variable that describes one or more attributes of a valid class of acknowledging users, a second memory space comprising a first user ranking, and a third memory space comprising a first user group variable;

retrieving, from a user interface database, a first user interface dataset associated with the first user group variable, wherein the first user interface dataset comprises one or more first user interface elements for rendering on end user devices;

communicating the first user interface elements to each user associated with the first user group variable, wherein the first user interface elements comprises visual elements that are specific to the first user group variable;

receiving, from the first user, a user data response based upon the first user interface elements;

accessing the first memory space and map the acknowledgement variable to a set of users that meets the one or more attributes of the valid class;

identify, using a correlating function, a second user from within the set of users, the second user comprising a highest correlation with the first user;

communicating at least a portion of the user data response to the second user, wherein the at least the portion of the user data response comprises one or more second user interface elements for rendering on an end user device associated with the second user;

receiving, from the second user, a first user data response ranking of the user data response;

updating the second memory space to include the first user data response ranking with the first user ranking; and communicating the first user data response ranking to the first user.

20. The computer program product of claim 19, wherein the executable instructions include instructions that are executable to configure the computer system to:

associate the first user group variable with a first geographic area;

receive a geolocation from a GPS device integrated within an end user device associated with the first user;

determine that the geolocation is within a threshold distance of the first geographic area; and retrieve from the communication database the first user interface elements associated with the first user group variable, wherein the first user interface elements are specific to the first geographic area; and communicate the first user interface elements to the first user.

* * * * *